(12) United States Patent
Li

(10) Patent No.: US 11,309,704 B2
(45) Date of Patent: Apr. 19, 2022

(54) BATTERY PROTECTION SYSTEMS

(71) Applicant: O2Micro Inc., Santa Clara, CA (US)

(72) Inventor: Guoxing Li, Sunnyvale, CA (US)

(73) Assignee: O2Micro Inc., Santa Clara, CA (US)

( * ) Notice: Subject to any disclaimer, the term of this patent is extended or adjusted under 35 U.S.C. 154(b) by 420 days.

(21) Appl. No.: 16/676,107

(22) Filed: Nov. 6, 2019

(65) Prior Publication Data

US 2020/0153235 A1 May 14, 2020

(51) Int. Cl.
| | |
|---|---|
| *H02H 7/18* | (2006.01) |
| *H01M 10/42* | (2006.01) |
| *H02H 3/08* | (2006.01) |
| *H02H 5/04* | (2006.01) |

(52) U.S. Cl.
CPC .......... *H02H 7/18* (2013.01); *H01M 10/4257* (2013.01); *H02H 3/085* (2013.01); *H02H 5/044* (2013.01)

(58) Field of Classification Search
CPC .......... H02H 7/18; H02H 3/085; H02H 5/044; H01M 10/4257; H01M 10/48; H01M 10/486; H01M 10/425; Y02E 60/10; G01K 13/00; H02J 7/0031; H02J 7/00309; H02J 7/007194; H02J 7/0091; H02J 7/007192
See application file for complete search history.

(56) References Cited

U.S. PATENT DOCUMENTS

| | | | |
|---|---|---|---|
| 5,150,033 A | 9/1992 | Conway | |
| 6,107,780 A | 8/2000 | Kellerman | |
| 6,331,764 B1 | 12/2001 | Oglesbee et al. | |
| 6,335,762 B1 | 1/2002 | Lee | |
| 6,781,803 B1 | 8/2004 | Smith | |
| 7,209,158 B2 | 4/2007 | Ghang et al. | |
| 7,506,183 B2 | 3/2009 | Araya | |
| 7,746,031 B2 | 6/2010 | Ishishita | |
| 9,952,267 B2 | 4/2018 | Lee | |
| 11,131,597 B1* | 9/2021 | Oakes, III | G06T 7/0004 |
| 2005/0242779 A1* | 11/2005 | Yoshio | H01M 10/48 |
| | | | 320/134 |
| 2008/0116851 A1* | 5/2008 | Mori | H02J 7/0031 |
| | | | 320/136 |

(Continued)

FOREIGN PATENT DOCUMENTS

| | | |
|---|---|---|
| CN | 1207636 A | 2/1999 |
| CN | 1277741 A | 12/2000 |

(Continued)

*Primary Examiner* — Stacy Whitmore

(57) ABSTRACT

A battery protection system includes a sensor, a primary protection circuit, coupled to the sensor, and a secondary protection circuit, coupled to the primary protection circuit and the sensor. The sensor is configured to generate a sense signal indicative of temperature in a battery pack when the sensor is activated. The primary protection circuit is configured to generate a synchronizing signal in a first state or a second state, sample the sense signal when the synchronizing signal is in the first state, and provide primary protection to the battery pack based on the sense signal. A secondary protection circuit is configured to be controlled by the synchronizing signal, sample the sense signal when the synchronizing signal is in the second state, and provide secondary protection to the battery pack based on the sense signal.

20 Claims, 13 Drawing Sheets

(56) References Cited

U.S. PATENT DOCUMENTS

| | | | | |
|---|---|---|---|---|
| 2009/0058362 A1* | 3/2009 | Yun | ........................ | H02J 7/0031 320/134 |
| 2011/0293970 A1* | 12/2011 | Shimura | ............. | H01M 10/486 429/7 |
| 2013/0163134 A1 | 6/2013 | Ji | | |
| 2015/0162763 A1* | 6/2015 | Kimura | ................. | H02J 7/0031 320/134 |
| 2020/0153235 A1* | 5/2020 | Li | ...................... | H01M 10/4257 |

FOREIGN PATENT DOCUMENTS

| | | | | |
|---|---|---|---|---|
| CN | 1314020 | A | 9/2001 | |
| CN | 1385972 | A | 12/2002 | |
| CN | 1519662 | A | 8/2004 | |
| CN | 1529517 | A | 9/2004 | |
| CN | 1783574 | A | 6/2006 | |
| CN | 101123358 | A | 2/2008 | |
| CN | 101142733 | A | 3/2008 | |
| CN | 201946960 | U | 8/2011 | |
| CN | 102183315 | A | 9/2011 | |
| CN | 201984104 | U | 9/2011 | |
| CN | 104838278 | A | 8/2015 | |
| CN | 106684829 | A | 5/2017 | |
| CN | 107482261 | A | 12/2017 | |
| EP | 2043224 | A2 * | 4/2009 | ............ H02J 7/0011 |
| GB | 2563489 | A * | 12/2018 | ....... G01R 19/16542 |
| WO | WO-2006112667 | A1 * | 10/2006 | .......... H01M 10/482 |

* cited by examiner

BATTERY PROTECTION SYSTEMS

RELATED APPLICATION

This application claims benefit under 35 U.S.C. § 119(a) to Application No. GB1818319.4, filed with the United Kingdom Intellectual Property Office on Nov. 9, 2018, hereby incorporated herein by reference in its entirety.

BACKGROUND

Battery protection systems play key roles to protect battery cells/packs from abnormal conditions such as over/under-voltage, over-current, short-circuit, and over/under-temperature conditions to ensure a safe application environment. A conventional battery protection system includes a primary protection circuit and a secondary protection circuit. The primary protection circuit monitors statuses of battery cells in a battery pack and provides primary protection. If an abnormal condition is detected, then the primary protection circuit takes action, e.g., turns off a charge switch and/or a discharge switch, to protect the battery pack. In case the primary protection circuit does not function, e.g., the primary protection circuit operates in a sleep mode or the primary protection circuit is not functioning, the secondary protection circuit provides backup protection to the battery pack.

FIG. 1 illustrates a circuit diagram of a conventional battery protection system for a battery pack 100. The protection system includes a primary protection circuit 102 and a secondary protection circuit 104. The primary protection circuit 102 provides power to activate a thermistor $R_{TS1}$ and monitors temperature in the battery pack 100 by sampling a sense signal from the thermistor $R_{TS1}$. Similarly, the secondary protection circuit 104 provides power to activate a thermistor $R_{TS2}$ and monitors temperature in the battery pack 100 by sampling a sense signal from the thermistor $R_{TS2}$. As a result, the primary protection circuit 102 and the secondary protection circuit 104 can protect the battery pack 100 from an over-temperature condition and/or an under-temperature condition.

However, the conventional battery protection system has some shortcomings. Thermistors are relatively expensive components and are relatively large. The conventional battery protection system includes two thermistors, and this not only increases the cost of the system but also increases the PCB (printed circuit board) size of the system. Additionally, if the thermistors $R_{TS1}$ and $R_{TS2}$ are activated in parallel, it also increases the power consumption of the system.

Thus, a battery protection system that addresses the abovementioned shortcomings would be beneficial.

SUMMARY

In an embodiment, a battery protection system includes a sensor, a primary protection circuit, coupled to the sensor, and a secondary protection circuit, coupled to the primary protection circuit and the sensor. The sensor is configured to generate a sense signal indicative of a temperature in a battery pack when the sensor is activated. The primary protection circuit is configured to generate a synchronizing signal in a first state or a second state, sample the sense signal when the synchronizing signal is in the first state, and provide primary protection to the battery pack based on the sense signal. A secondary protection circuit is configured to be controlled by the synchronizing signal, sample the sense signal when the synchronizing signal is in the second state, and provide secondary protection to the battery pack based on the sense signal.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

An embodiment of the present invention provides a battery protection system including a primary protection system and a secondary protection system that share a thermistor, and provides a method of how to control, e.g., synchronize, the primary and secondary protection circuits so that they can share the thermistor. As a result, the cost and PCB (printed circuit board) size of the battery protection system can be reduced. The power consumption of the battery protection system can also be reduced.

Figure 1:
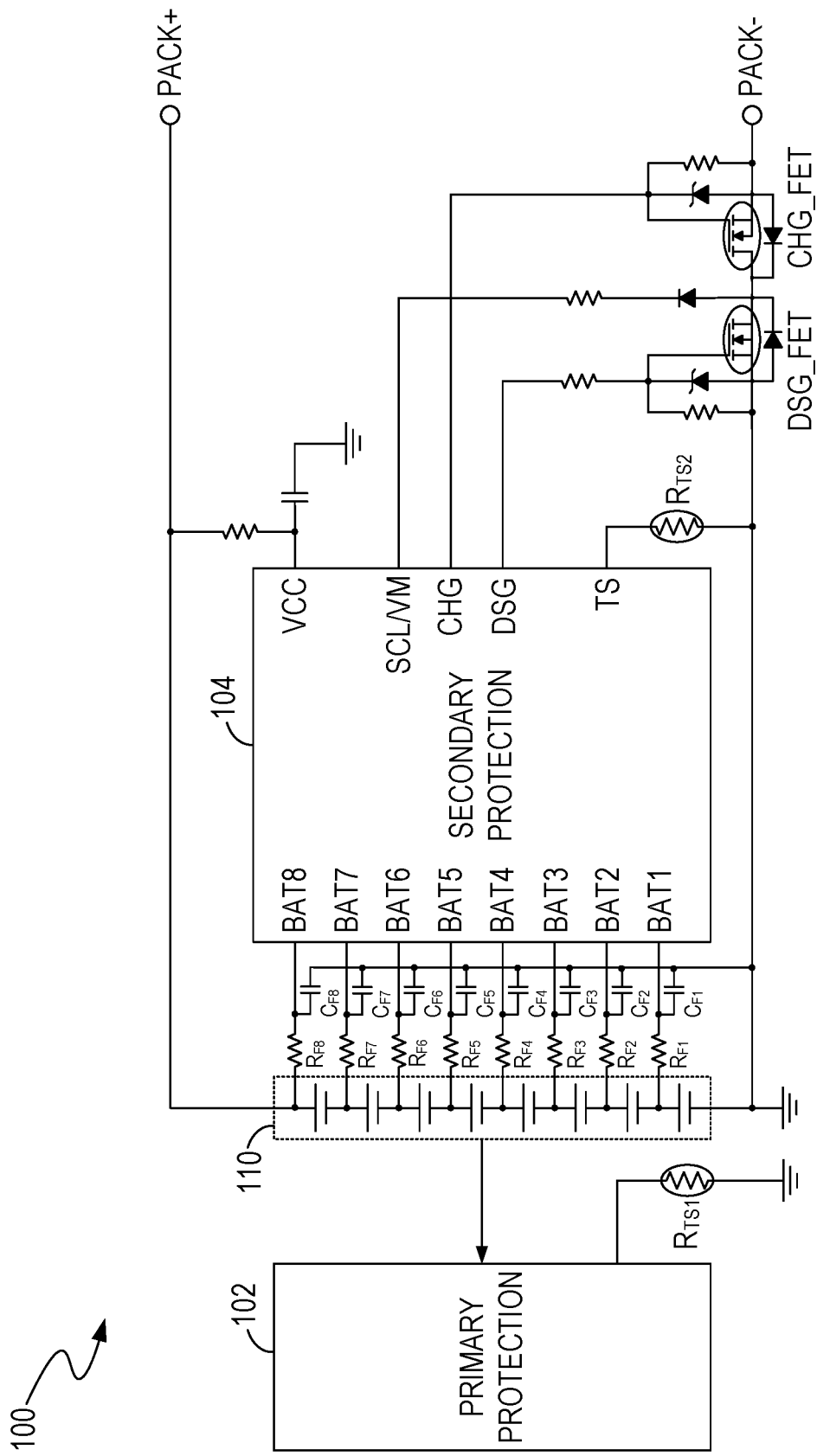
FIG. 1 illustrates a circuit diagram of a conventional battery protection system.
Figure 2:
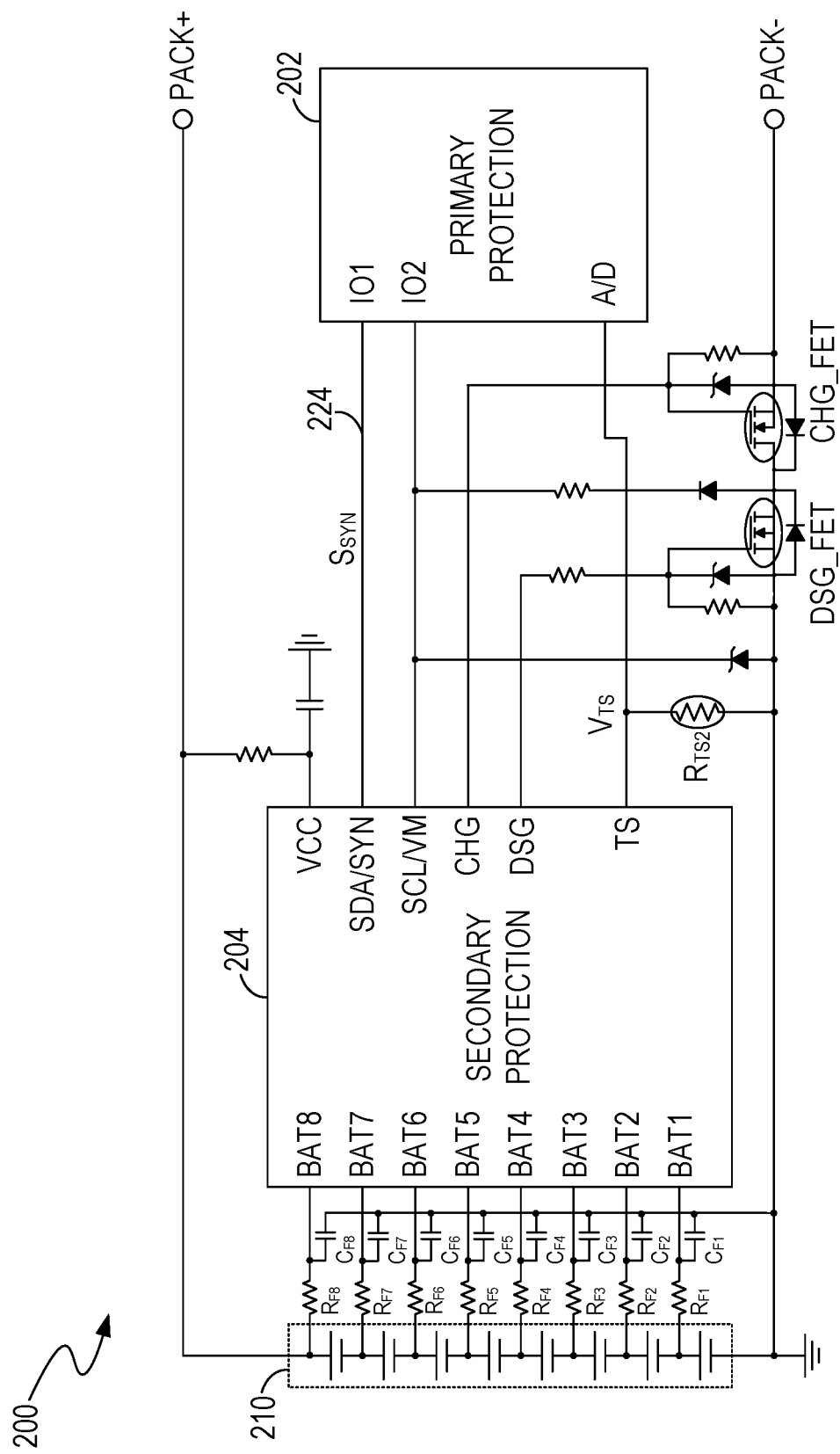
FIG. 2 illustrates an example of a circuit diagram of a battery protection system, in an embodiment of the present invention.

FIG. 2 illustrates an example of a circuit diagram of a battery protection system for a battery pack 200, in an embodiment of the present invention. In an embodiment, the battery pack 200 includes battery cells 210, e.g., rechargeable battery cells such as lithium-ion battery cells, nickel-cadmium battery cells, lead-acid battery cells, solar battery cells, or the like. The battery protection system in the battery pack 200 is configured to protect the battery cells 210 from abnormal conditions. The abnormal conditions include over-temperature conditions and/or under-temperature conditions. As shown in FIG. 2, the battery protection system includes a primary protection circuit 202 and a secondary protection circuit 204.

In an embodiment, the primary protection circuit 202 monitors statuses of the battery cells 210 and temperature of the battery pack to provide primary protection. In case the primary protection circuit 202 does not function, e.g., the primary protection circuit 202 operates in a sleep mode or the primary protection circuit 202 is not functioning, the secondary protection circuit 204 provides backup protection to the battery pack. In an embodiment, the primary protection circuit 202 and the secondary protection circuit 204 share a temperature sensor, e.g., including a thermistor $R_{TS2}$. The temperature sensor $R_{TS2}$ can generate a sense signal $V_{TS}$, e.g., a voltage signal, indicative of temperature in the battery pack 200 when the temperature sensor $R_{TS2}$ is activated.

In an embodiment, the primary protection circuit 202 is coupled to the secondary protection circuit 204 via a communication channel 224, and is configured to generate a synchronizing signal $S_{SYN}$ in the communication channel 224. The communication channel 224 can include, but is not limited to, a signal line, an I²C (inter-integrated circuit) interface, an UART (universal asynchronous receiver-transmitter) interface, or the like. The synchronizing signal $S_{SYN}$ is operable for synchronizing the primary protection circuit 202 and the secondary protection circuit 204 so that the primary protection circuit 202 and the secondary protection circuit 204 can share the temperature sensor $R_{TS2}$, and so that the primary protection circuit 202 and the secondary protection circuit 204 do not disturb each other. The synchronizing signal $S_{SYN}$ can include one or more control signals that control the secondary protection circuit 204, and can be in a first state or a second state. For example, the synchronizing signal $S_{SYN}$ may be a control signal at logic high (or logic low) in the first state, or a control signal at logic low (or logic high) in the second state. For another example, the synchronizing signal $S_{SYN}$ may include a set of control signals, e.g., digital signals. The control signals are at a first combination of logic levels when the synchronizing signal $S_{SYN}$ is in the first state, and at a second combination of logic levels, different from the first combination of logic levels, when the synchronizing signal $S_{SYN}$ is in the second state.

In an embodiment, when the primary protection circuit 202 needs to sample the sense signal $V_{TS}$, the synchronizing signal $S_{SYN}$ is controlled to be in the first state. When the synchronizing signal $S_{SYN}$ is in the first state, the battery protection system activates the temperature sensor $R_{TS2}$ to provide the sense signal $V_{TS}$ to the primary protection circuit 202. The temperature sensor $R_{TS2}$ can be activated by the primary protection circuit 202 or the secondary protection circuit 204. The primary protection circuit 202 can sample the sense signal $V_{TS}$ and provide primary protection to the battery pack based on the sense signal $V_{TS}$. For example, if the sense signal $V_{TS}$ indicates that the battery pack is in an over-temperature condition, then the primary protection circuit 202 can take action, e.g., turn off a charging switch CHG_FET and/or a discharging switch DSG_FET, to protect the battery pack. For another example, if the sense signal $V_{TS}$ indicates that the battery pack is in an under-temperature condition, then the primary protection circuit 202 can take action, e.g., disable some operations or functions, to protect the battery pack. Additionally, when the synchronizing signal $S_{SYN}$ is in the first state, the secondary protection circuit 204 does not sample the sense signal $V_{TS}$. In an embodiment, when the primary protection circuit 202 does not sample the sense signal $V_{TS}$, e.g., when the primary protection circuit 202 is in a sleeping mode, the synchronizing signal $S_{SYN}$ is controlled to be in the second state. When the synchronizing signal $S_{SYN}$ is in the second state, the secondary protection circuit 204 activates the temperature sensor $R_{TS2}$ to generate the sense signal $V_{TS}$. The secondary protection circuit 204 also samples the sense signal $V_{TS}$ and provides secondary protection to the battery pack based on the sense signal $V_{TS}$. The secondary protection circuit 204 can activate the temperature sensor $R_{TS2}$ at a preset frequency, e.g., a relatively low frequency such as 1 Hz, 0.5 Hz, 2 Hz, or the like, and sample the sense signal $V_{TS}$ at the preset frequency, thereby reducing the power consumption. Additionally, when the synchronizing signal $S_{SYN}$ is in the second state, the primary protection circuit 202 does not sample the sense signal $V_{TS}$. In an embodiment, the frequency at which the primary protection circuit 202 samples the sense signal $V_{TS}$ (e.g., when the synchronizing signal $S_{SYN}$ is in the first state) is much higher than the frequency at which the secondary protection circuit 204 samples the sense signal $V_{TS}$ (e.g., when the synchronizing signal $S_{SYN}$ is in the second state).

Examples of methods of synchronizing the primary protection circuit 202 and the secondary protection circuit 204 so that the primary protection circuit 202 and the secondary protection circuit 204 can share the temperature sensor $R_{TS2}$ are described as follows in combination with FIG. 3A, FIG. 3B, FIG. 4A, FIG. 4B, FIG. 5A, FIG. 5B, FIG. 6A, FIG. 6B, FIG. 6C and FIG. 6D.

Figure 3A:
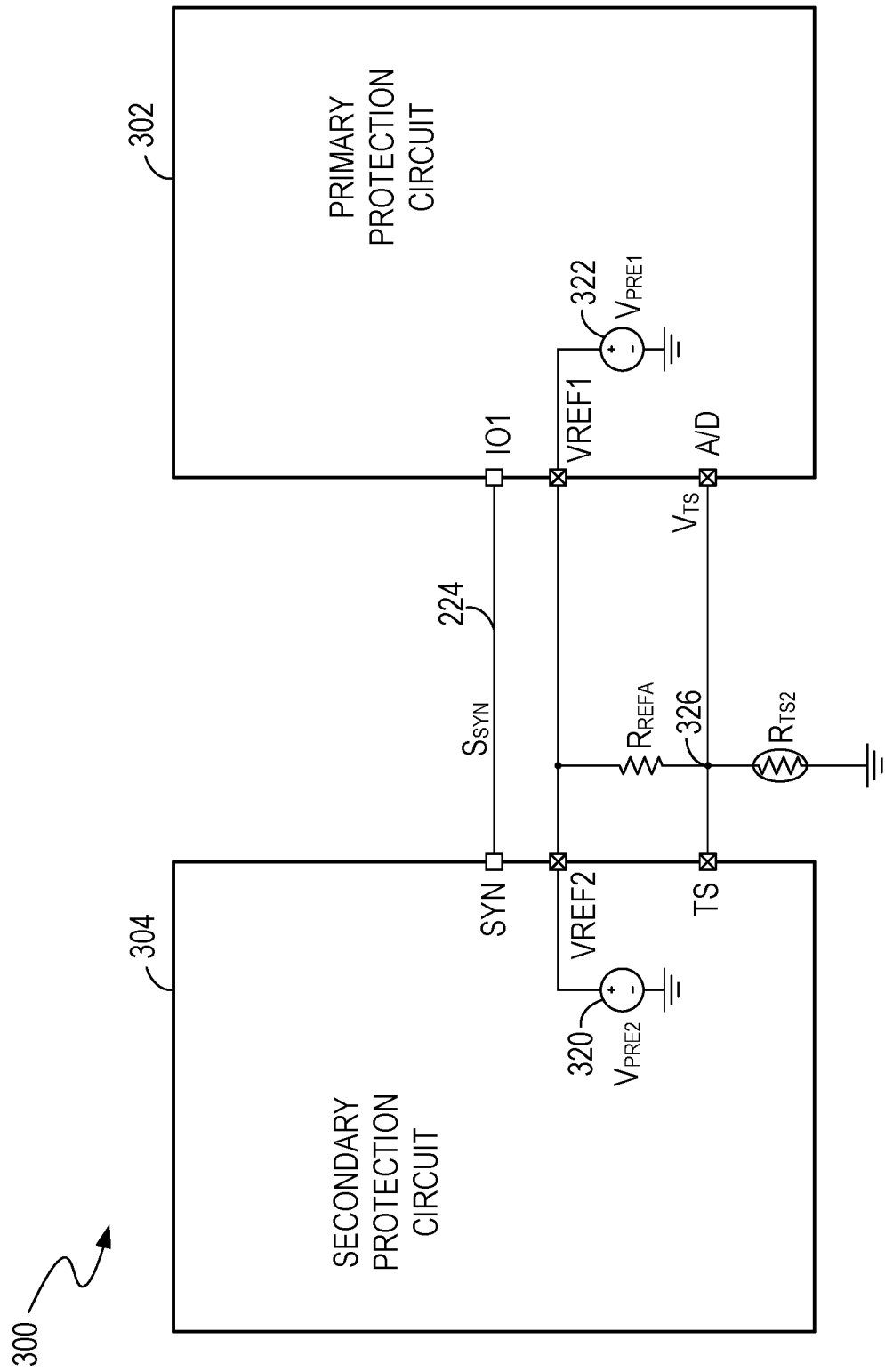
FIG. 3A illustrates an example of a block diagram of a battery protection system, in an embodiment of the present invention.

FIG. 3A illustrates an example of a block diagram of a battery protection system 300, in an embodiment of the present invention. The primary protection circuit 302 and the secondary protection circuit 304 in FIG. 3A can be examples of the primary protection circuit 202 and the secondary protection circuit 204 in FIG. 2. FIG. 3A is described in combination with FIG. 2.

In the example of FIG. 3A, the temperature sensor includes a thermistor $R_{TS2}$ and a resistor $R_{REF4}$ coupled to the thermistor $R_{TS2}$. The resistor $R_{REF4}$ and the thermistor $R_{TS2}$ can constitute a voltage divider. The battery protection system 300 can activate the temperature sensor by applying a preset voltage, e.g., Vii or $V_{PRE2}$, across the resistor $R_{REF4}$ and the thermistor $R_{TS2}$, so that a sense signal $V_{TS}$ is generated at the connection node 326 of the resistor $R_{REF4}$ and the thermistor $R_{TS2}$. The sense signal $V_{TS}$ at the connection node 326 can indicate the temperature in the battery pack. By way of example, the thermistor $R_{TS2}$ has a negative temperature coefficient. Thus, the resistance of the thermistor $R_{TS2}$ can decrease if the temperature increases, and can increase if the temperature decreases. As a result, the sense signal $V_{TS}$ at the connection node 326 can decrease if the temperature increases, and can increase if the temperature decreases.

In the example of FIG. 3A, the primary protection circuit 302 includes a voltage source 322 that provides a first preset voltage $V_{PRE1}$, and the secondary protection circuit 304 includes a voltage source 320 that provides a second preset voltage $V_{PRE2}$. When the synchronizing signal $S_{SYN}$ is in the second state, the primary protection circuit 302 disconnects the first preset voltage $V_{PRE1}$ from the temperature sensor, and the secondary protection circuit 304 connects the second preset voltage $V_{PRE2}$ to the temperature sensor at a preset frequency (e.g., a relatively low frequency such as 1 Hz, 0.5 Hz, 2 Hz, or the like). The secondary protection circuit 304 also samples the sense signal $V_{TS}$ at the preset frequency. When the synchronizing signal $S_{SYN}$ is in the first state, the primary protection circuit 302 connects the first preset voltage $V_{PRE1}$ to the temperature sensor, and maintains their connection status so that the primary protection circuit 302 can sample the sense signal $V_{TS}$, e.g., at a relatively high frequency. In addition, the secondary protection circuit 304 disconnects the second preset voltage $V_{PRE2}$ from the temperature sensor.

Figure 3B:
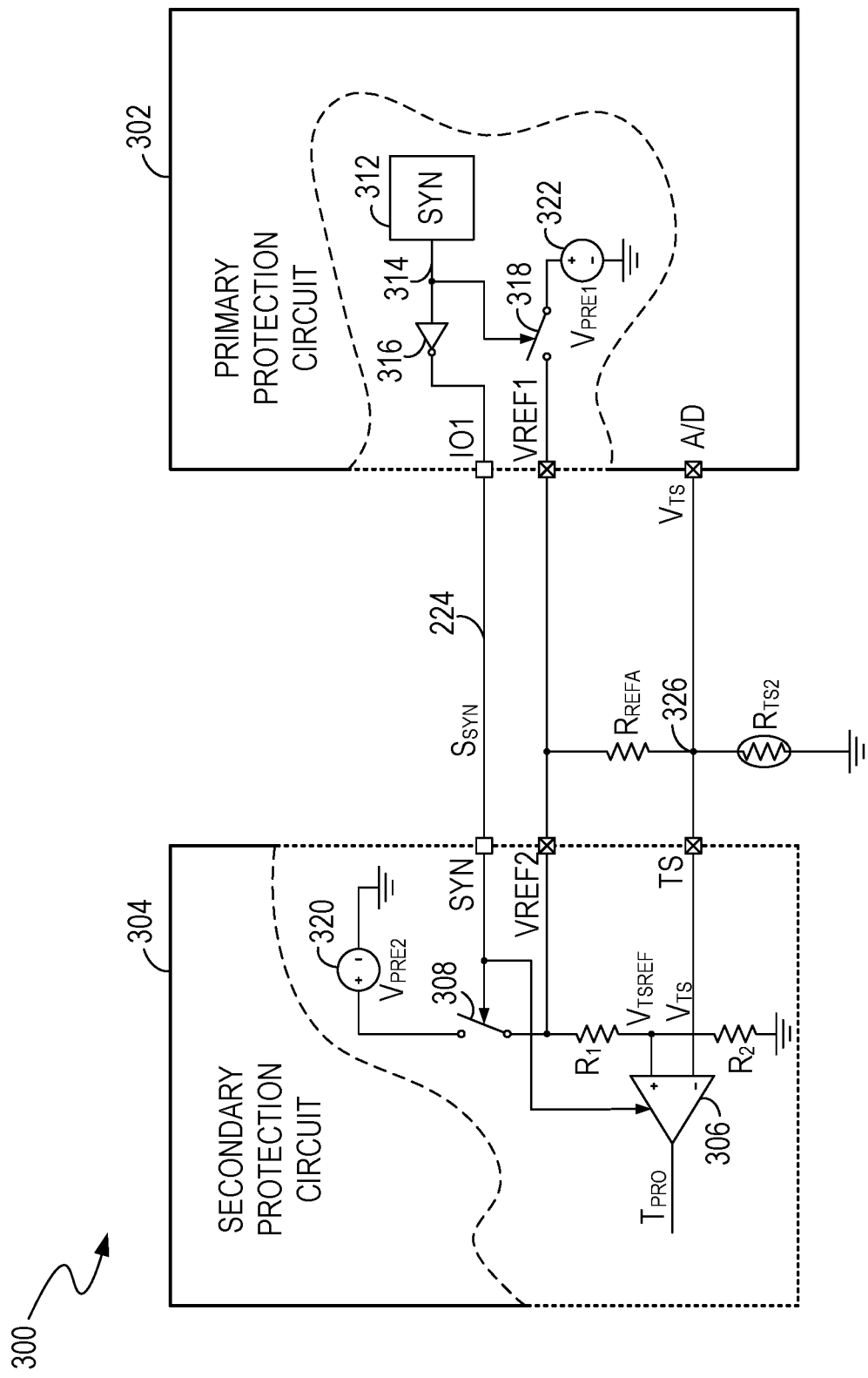
FIG. 3B illustrates an example of a circuit diagram of a battery protection system, in an embodiment of the present invention.

More specifically, a circuit diagram of an example of the battery protection system 300 is illustrated in FIG. 3B. FIG. 3B is described in combination with FIG. 2 and FIG. 3A. In the example of FIG. 3B, the primary protection circuit 302 includes a synchronizing signal generating circuit 312 (hereinafter, SYN circuit 312), a voltage source 322, a switch 318, and an inverter 316. The elements 312, 322, 318 and 316 shown in FIG. 3B are for illustration purposes only and are not intended to limit the scope of the present invention. The secondary protection circuit 304 includes a voltage source 320, a switch 308, a comparator 306, and a reference voltage divider including resistors $R_1$ and $R_2$.

In an embodiment, the SYN circuit 312 in the primary protection circuit 302 can generate a control signal 314 to control a status of the synchronizing signal $S_{SYN}$ and control the switch 318. For example, the control signal 314 can control the synchronizing signal $S_{SYN}$ to be in the second state and turn off the switch 318. The control signal 314 can also control the synchronizing signal $S_{SYN}$ to be in the first state and turn on the switch 318. Thus, in an embodiment, when the synchronizing signal $S_{SYN}$ is in the second state, the switch 318 can disconnect the temperature sensor from the first preset voltage $V_{PRE1}$, and the synchronizing signal $S_{SYN}$ can turn on the switch 308 and enable the comparator 306 in the secondary protection circuit 304. When the switch 308 is on, the temperature sensor (e.g., a sensor voltage divider including the resistor $R_{REF4}$ and the thermistor $R_{TS2}$) and the reference voltage divider receive the same supply voltage $V_{PRE2}$. Thus, if a ratio of the thermistor's resistance $R_{TS2}$ to the resistance $R_{REF4}$ (e.g., $R_{TS2}/R_{REF4}$) is equal to a ratio of the resistance $R_2$ to the resistance $R_1$ (e.g., $R_2/R_1$), then a sense voltage $V_{TS}$ at the connection node 326 can be approximately equal to a reference voltage $V_{TSREF}$ at the connection node of the resistors $R_1$ and $R_2$. In an embodiment, the resistances $R_1$, $R_2$, and $R_{REF4}$ are set such that when the temperature of the battery pack is approximately equal to an over-temperature threshold, the ratio $R_{TS2}/R_{REF4}$ is approximately equal to the ratio $R_2/R_1$. As a result, if the temperature of the battery pack is less than the over-temperature threshold, then the ratio $R_{TS2}/R_{REF4}$ is greater than the ratio $R_2/R_1$ and therefore the sense voltage $V_{TS}$ is greater than the reference voltage $V_{TSREF}$. If the temperature of the battery pack is greater than the over-temperature threshold, then the ratio $R_{TS2}/R_{REF4}$ is less than the ratio $R_2/R_1$ and therefore the sense voltage $V_{TS}$ is less than the reference voltage $V_{TSREF}$. The comparator 306 can compare the sense voltage $V_{TS}$ with the reference voltage $V_{TSREF}$ to generate a protection signal $T_{PRO}$ according to the comparison. If the sense voltage $V_{TS}$ is less than the reference voltage $V_{TSREF}$, then the protection signal $T_{PRO}$ can inform the secondary protection circuit 304 to take action to protect the battery pack from an over-temperature condition.

In an embodiment, when the synchronizing signal $S_{SYN}$ is in the first state, the switch 318 can connect the temperature sensor to the first preset voltage $V_{PRE1}$, and the synchronizing signal $S_{SYN}$ can turn off the switch 308 and disable the comparator 306 in the secondary protection circuit 304. Thus, the temperature sensor is activated by the first preset voltage $V_{PRE1}$ to generate a sense signal $V_{TS}$, and the sense signal $V_{TS}$ is provided to a monitoring terminal A/D of the primary protection circuit 302. The primary protection circuit 302 may include an internal A/D (analog to digital) converter circuit (not shown) that converts the sense signal $V_{TS}$ to a digital signal readable by the primary protection circuit 302. Thus, the primary protection circuit 302 can determine whether an over-temperature or an under-temperature condition is present based on the sense signal $V_{TS}$, to protect the battery pack.

Figure 4A:
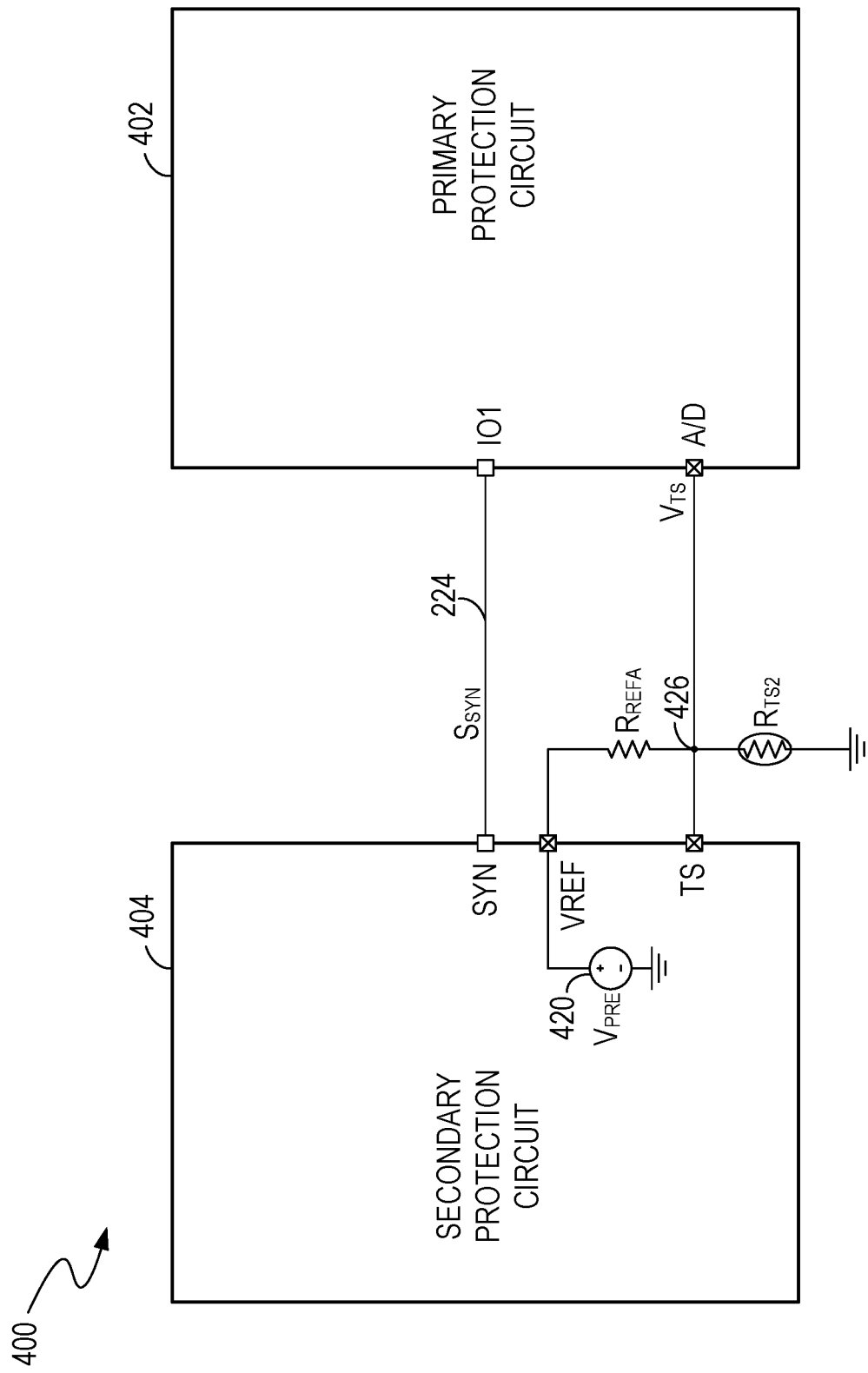
FIG. 4A illustrates an example of a block diagram of a battery protection system, in an embodiment of the present invention.

FIG. 4A illustrates another example of a block diagram of a battery protection system 400, in an embodiment of the present invention. The primary protection circuit 402 and the secondary protection circuit 404 in FIG. 4A can be examples of the primary protection circuit 202 and the secondary protection circuit 204 in FIG. 2. FIG. 4A is described in combination with FIG. 2 and FIG. 3A.

Similar to the temperature sensor in FIG. 3A, in the example of FIG. 4A, the temperature sensor includes a thermistor $R_{TS2}$ and a resistor $R_{REF4}$ that constitute a voltage divider. The battery protection system 400 can activate the temperature sensor by applying a preset voltage $V_{PRE}$ across the resistor $R_{REF4}$ and the thermistor $R_{TS2}$, so that a sense signal $V_{TS}$ is generated to indicate the temperature in the battery pack.

In the example of FIG. 4A, the secondary protection circuit 404 includes a voltage source 420 that provides a preset voltage $V_{PRE}$. When the synchronizing signal $S_{SYN}$ is in the second state, the secondary protection circuit 404 connects the preset voltage $V_{PRE}$ to the temperature sensor at a preset frequency (e.g., a relatively low frequency such as 1 Hz, 0.4 Hz, 2 Hz, or the like), and samples the sense signal $V_{TS}$ at the preset frequency. When the synchronizing signal $S_{SYN}$ is in the first state, the secondary protection circuit 404 maintains the preset voltage $V_{PRE}$ connected to the temperature sensor, and the primary protection circuit 402 samples the sense signal $V_{TS}$.

Figure 4B:
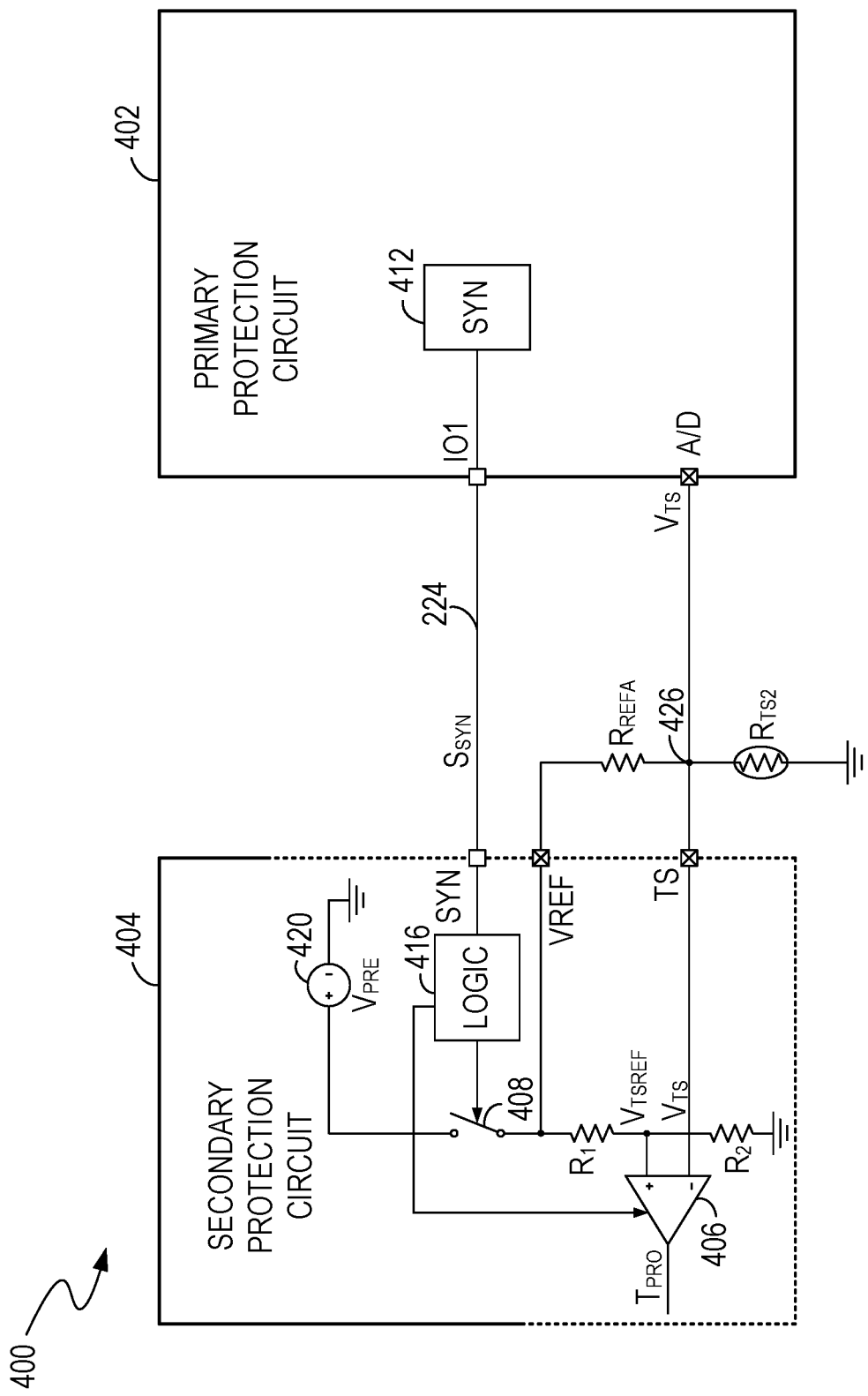
FIG. 4B illustrates an example of a circuit diagram of a battery protection system, in an embodiment of the present invention.

More specifically, an example of a circuit diagram of the battery protection system 400 is illustrated in FIG. 4B. FIG. 4B is described in combination with FIG. 2 and FIG. 4A. In the example of FIG. 4B, the primary protection circuit 402 includes a synchronizing signal generating circuit 412 (hereinafter, SYN circuit 412) that generates a synchronizing signal $S_{SYN}$ and controls a status of the synchronizing signal $S_{SYN}$. The secondary protection circuit 404 includes a voltage source 420, a switch 408, a comparator 406, a logic circuit 416, and a reference voltage divider that includes the resistors $R_1$ and $R_2$. The logic circuit 416 can receive the synchronizing signal $S_{SYN}$ and control the switch 408 and the comparator 406 according to the synchronizing signal $S_{SYN}$.

In an embodiment, when the synchronizing signal $S_{SYN}$ is in the second state, the logic circuit 416 can turn on the switch 408 at the abovementioned preset frequency, and enable the comparator 406 at the preset frequency. Thus, the secondary protection circuit 404 can sample the sense signal $V_{TS}$ at the preset frequency. When the synchronizing signal $S_{SYN}$ is in the second state, the primary protection circuit 402 does not sample the sense signal $V_{TS}$. When the synchronizing signal $S_{SYN}$ is in the first state, the logic circuit 416 keeps the switch 408 turned on, and the primary protection circuit 402 samples the sense signal $V_{TS}$. When the synchronizing signal $S_{SYN}$ is in the first state, the logic circuit 416 may, but not necessarily, disable the comparator 406.

Although a logic circuit 416 is disclosed in FIG. 4B, the logic circuit 416 can be omitted in another implementation. For instance, as mentioned above, the communication channel 224 can include an interface such as an I²C interface, an UART interface, or the like, and the synchronizing signal $S_{SYN}$ in the communication channel 224 can include a set of signals. The set of signals may include a signal that controls the switch 408, and a signal that controls the comparator 406.

Figure 5A:
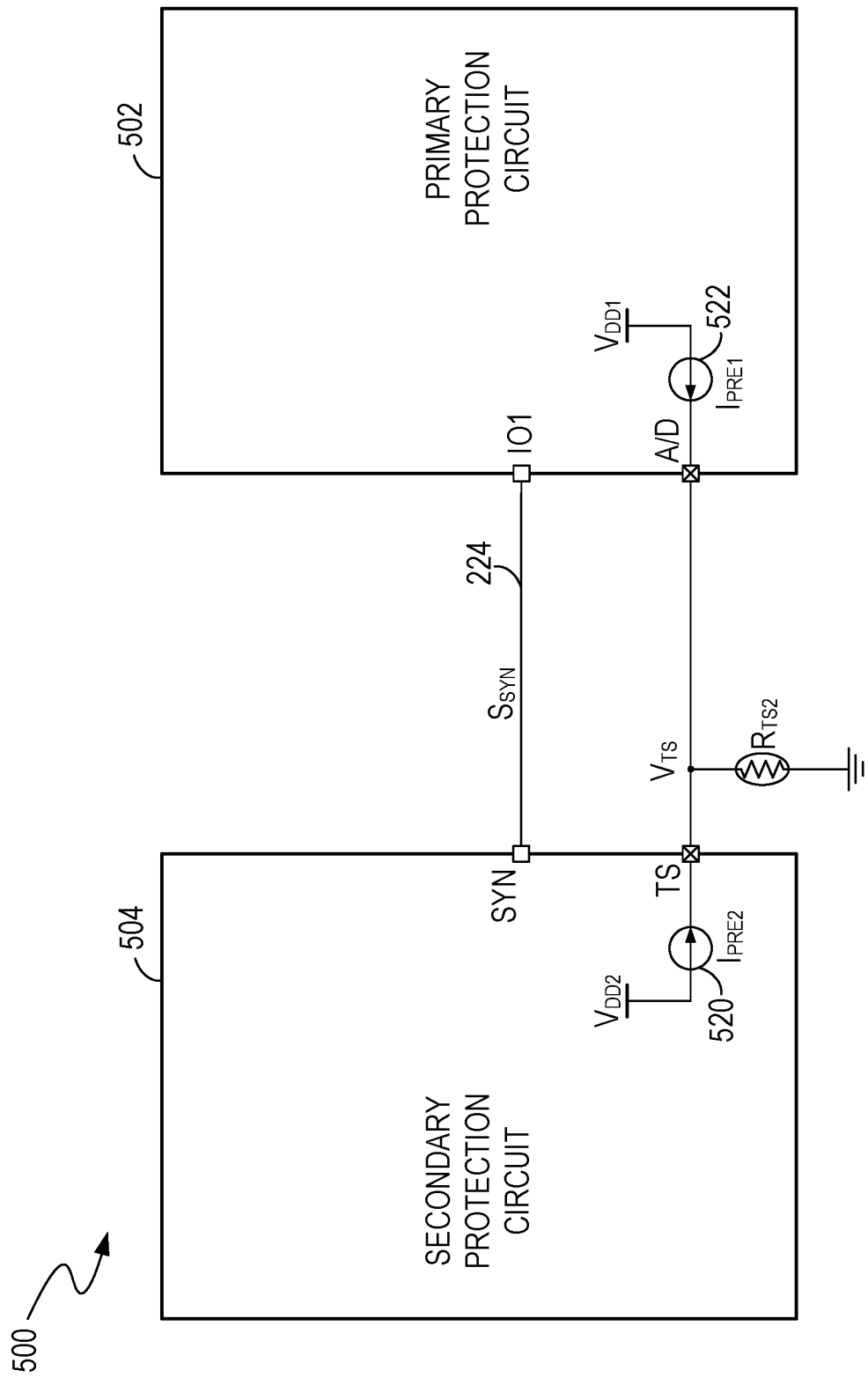
FIG. 5A illustrates an example of a block diagram of a battery protection system, in an embodiment of the present invention.

FIG. 5A illustrates another example of a block diagram of a battery protection system 500, in an embodiment of the present invention. The primary protection circuit 502 and the secondary protection circuit 504 in FIG. 5A can be examples of the primary protection circuit 202 and the secondary protection circuit 204 in FIG. 2. FIG. 5A is described in combination with FIG. 2.

In the example of FIG. 5A, the temperature sensor includes a thermistor $R_{TS2}$. The battery protection system 300 can activate the thermistor $R_{TS2}$ by generating a preset current, e.g., $I_{PRE1}$ or $I_{PRE2}$, that flows through the thermistor $R_{TS2}$, so that a sense signal $V_{TS}$ (e.g., a voltage signal) is generated on the thermistor $R_{TS2}$. The sense signal $V_{TS}$ on the thermistor $R_{TS2}$ can indicate the temperature in the battery pack. By way of example, the thermistor $R_{TS2}$ has a negative temperature coefficient. Thus, the resistance of the thermistor $R_{TS2}$ can decrease if the temperature increases, and can increase if the temperature decreases. As a result, the sense signal $V_{TS}$ at the connection node 326 can decrease if the temperature increases, and can increase if the temperature decreases.

In the example of FIG. 5A, the primary protection circuit 502 includes a current source 522 configured to provide a first preset current $I_{PRE1}$ through the thermistor $R_{TS2}$, and the secondary protection circuit 504 includes a current source 520 configured to provide a second preset current $I_{PRE2}$ through the thermistor $R_{TS2}$. When the synchronizing signal $S_{SYN}$ is in the second state, the primary protection circuit 502 disables the first preset current $I_{PRE1}$, and the secondary protection circuit 504 generates the second preset current $I_{PRE2}$ at a preset frequency (e.g., a relatively low frequency such as 1 Hz, 0.5 Hz, 2 Hz, or the like). The secondary protection circuit 504 also samples the sense signal $V_{TS}$ at the preset frequency. When the synchronizing signal $S_{SYN}$ is in the first state, the primary protection circuit 502 generates the first preset current $I_{PRE1}$ and maintains the first preset current $I_{PRE1}$ through the thermistor $R_{TS2}$, so that the primary protection circuit 502 can sample the sense signal $V_{TS}$, e.g., at a relatively high frequency. In addition, the secondary protection circuit 504 disables the second preset current $I_{PRE2}$.

Figure 5B:
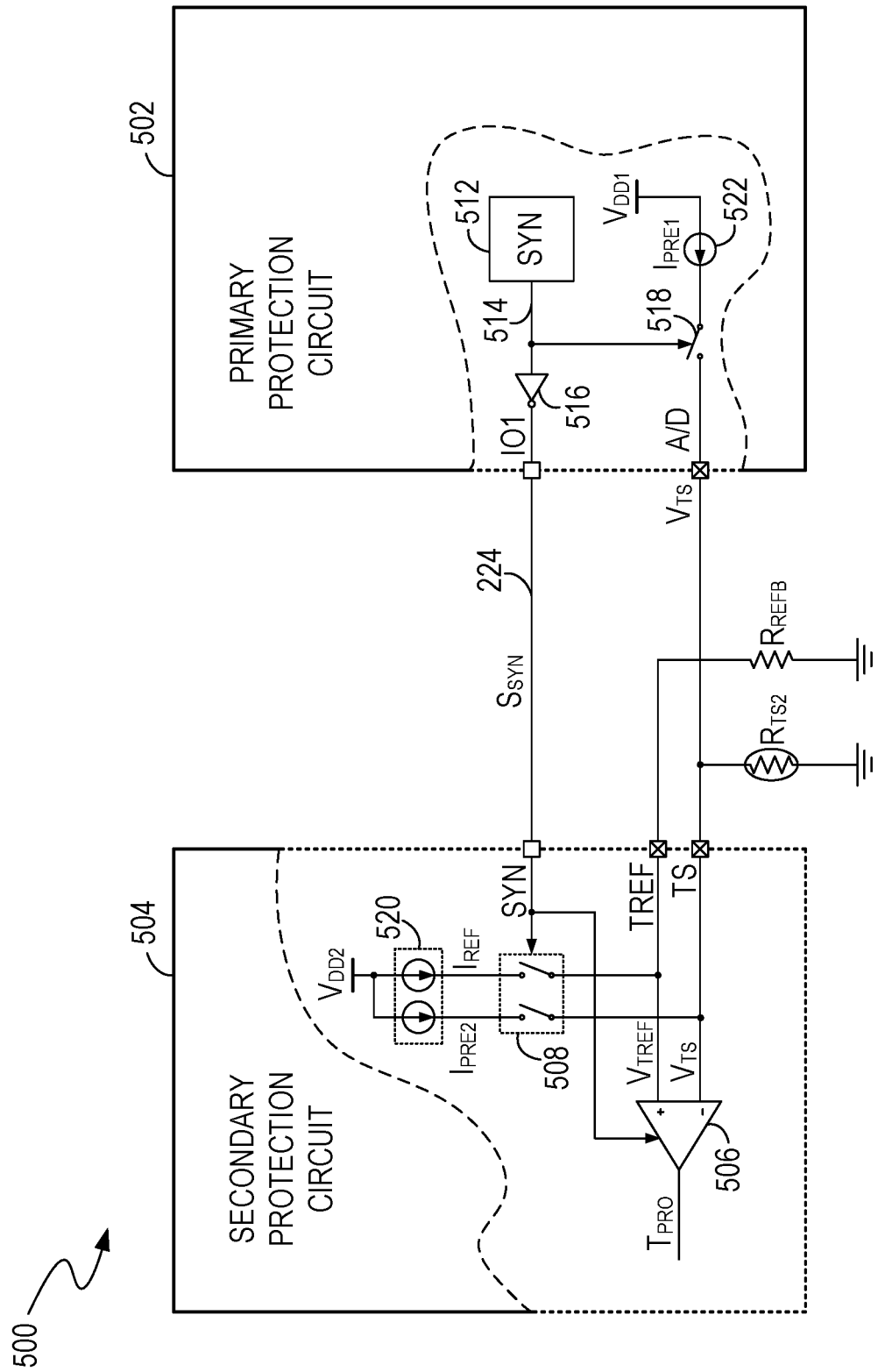
FIG. 5B illustrates an example of a circuit diagram of a battery protection system, in an embodiment of the present invention.

More specifically, an example of a circuit diagram of the battery protection system 500 is illustrated in FIG. 5B. FIG. 5B is described in combination with FIG. 2 and FIG. 5A. In the example of FIG. 5B, the primary protection circuit 502 includes a synchronizing signal generating circuit 512 (hereinafter, SYN circuit 512), a current source 522, a switch 518, and an inverter 516. The elements 512, 522, 518 and 516 shown in FIG. 5B are for illustration purposes only and are not intended to limit the scope of the present invention. The secondary protection circuit 504 includes a current source 520 such as a current mirror, a switch circuit 508, and a comparator 506. Additionally, the secondary protection circuit 504 includes a reference terminal TREF coupled to a reference resistor $R_{REFB}$.

In an embodiment, the SYN circuit 512 in the primary protection circuit 502 can generate a control signal 514 to control a status of the synchronizing signal $S_{SYN}$ and control the switch 518. For example, the control signal 514 can control the synchronizing signal $S_{SYN}$ to be in the second state and turn off the switch 518. The control signal 514 can also control the synchronizing signal $S_{SYN}$ to be in the first state and turn on the switch 518. Thus, in an embodiment, when the synchronizing signal $S_{SYN}$ is in the second state, the switch 518 can disable the first preset current $I_{PRE1}$, and the synchronizing signal $S_{SYN}$ can turn on the switch circuit 508 and enable the comparator 506 in the secondary protection circuit 504. When the switch circuit 508 is on (e.g., both the switches in the circuit 508 are on), the thermistor $R_{TS2}$ and the reference resistor $R_{REFB}$ can respectively receive the second preset current $I_{PRE2}$ and a reference current $I_{REF}$. More specifically, the current source 520 can generate a reference current $I_{REF}$ and a second preset current $I_{PRE2}$. The current source 520 can also control the second preset current $I_{PRE2}$ to be proportional to the reference current $I_{REF}$. For example, the second preset current $I_{PRE2}$ can be substantially equal to the reference current $I_{REF}$. Thus, if the resistance of the thermistor $R_{TS2}$ is equal to the reference resistance $R_{REFB}$, then a sense voltage $V_{TS}$ on the thermistor $R_{TS2}$ can be substantially equal to a reference voltage $V_{TREF}$ on the reference resistor $R_{REFB}$. In an embodiment, the reference resistance $R_{REFB}$ is set such that when the temperature of the battery pack is approximately equal to an over-temperature threshold, the thermistor's resistance $R_{TS2}$ can be approximately equal to the reference resistance $R_{REFB}$. As a result, if the temperature of the battery pack is less than the over-temperature threshold, then the thermistor's resistance $R_{TS2}$ is greater than the reference resistance $R_{REFB}$ and therefore the sense voltage $V_{TS}$ is greater than the reference voltage $V_{TREF}$. If the temperature of the battery pack is greater than the over-temperature threshold, then the thermistor's resistance $R_{TS2}$ is less than the reference resistance $R_{REFB}$ and therefore the sense voltage $V_{TS}$ is less than the reference voltage $V_{TREF}$. The comparator 506 can compare the sense voltage $V_{TS}$ with the reference voltage $V_{TREF}$ to generate a protection signal $T_{PRO}$ according to the comparison. If the sense voltage $V_{TS}$ is less than the reference voltage $V_{TREF}$, then the protection signal $T_{PRO}$ can inform the secondary protection circuit 504 to take action to protect the battery pack from an over-temperature condition.

In an embodiment, when the synchronizing signal $S_{SYN}$ is in the first state, the switch 518 can connect the current source 522 to the thermistor $R_{TS2}$, and the synchronizing signal $S_{SYN}$ can turn off the switch circuit 508 and disable the comparator 506 in the secondary protection circuit 504. Thus, the thermistor $R_{TS2}$ is activated by the first preset current $I_{PRE1}$ to generate a sense signal $V_{TS}$, and the sense signal $V_{TS}$ is provided to a monitoring terminal A/D of the primary protection circuit 502. The primary protection circuit 502 may include an internal A/D (analog to digital) converter circuit (not shown) that converters the sense signal $V_{TS}$ to a digital signal readable by the primary protection circuit 502. Thus, the primary protection circuit 502 can determine whether an over-temperature or an under-temperature condition is present based on the sense signal $V_{TS}$, to protect the battery pack.

Figure 6A:
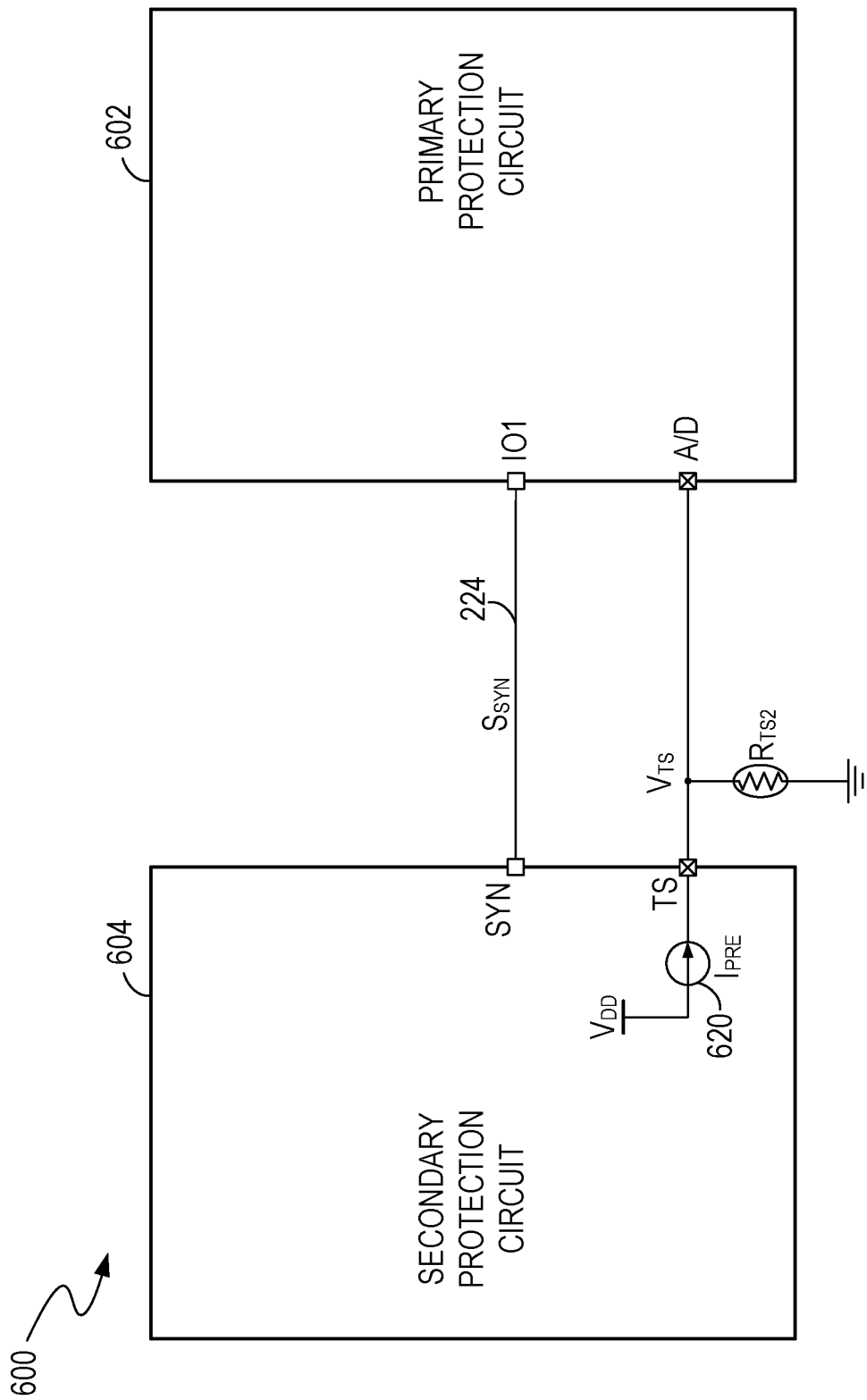
FIG. 6A illustrates an example of a block diagram of a battery protection system, in an embodiment of the present invention.

FIG. 6A illustrates another example of a block diagram of a battery protection system 600, in an embodiment of the present invention. The primary protection circuit 602 and the secondary protection circuit 604 in FIG. 6A can be examples of the primary protection circuit 202 and the secondary protection circuit 204 in FIG. 2. FIG. 6A is described in combination with FIG. 2 and FIG. 5A.

Similar to the temperature sensor in FIG. 5A, in the example of FIG. 6A, the temperature sensor includes a thermistor $R_{TS2}$. The battery protection system 600 can activate the temperature sensor by applying a preset current $I_{PRE}$ through the thermistor $R_{TS2}$, so that a sense signal $V_{TS}$ is generated to on the thermistor $R_{TS2}$.

In the example of FIG. 6A, the secondary protection circuit 604 includes a current source 620 that provides a preset current $I_{PRE}$. When the synchronizing signal $S_{SYN}$ is in the second state, the secondary protection circuit 604 generates the preset current $I_{PRE}$ at a preset frequency (e.g., a relatively low frequency such as 1 Hz, 0.5 Hz, 2 Hz, or the like), and samples the sense signal $V_{TS}$ at the preset frequency. When the synchronizing signal $S_{SYN}$ is in the first state, the secondary protection circuit 604 maintains the preset current $I_{PRE}$ to be flowing through the thermistor $R_{TS2}$, and the primary protection circuit 602 samples the sense signal $V_{TS}$.

Figure 6B:
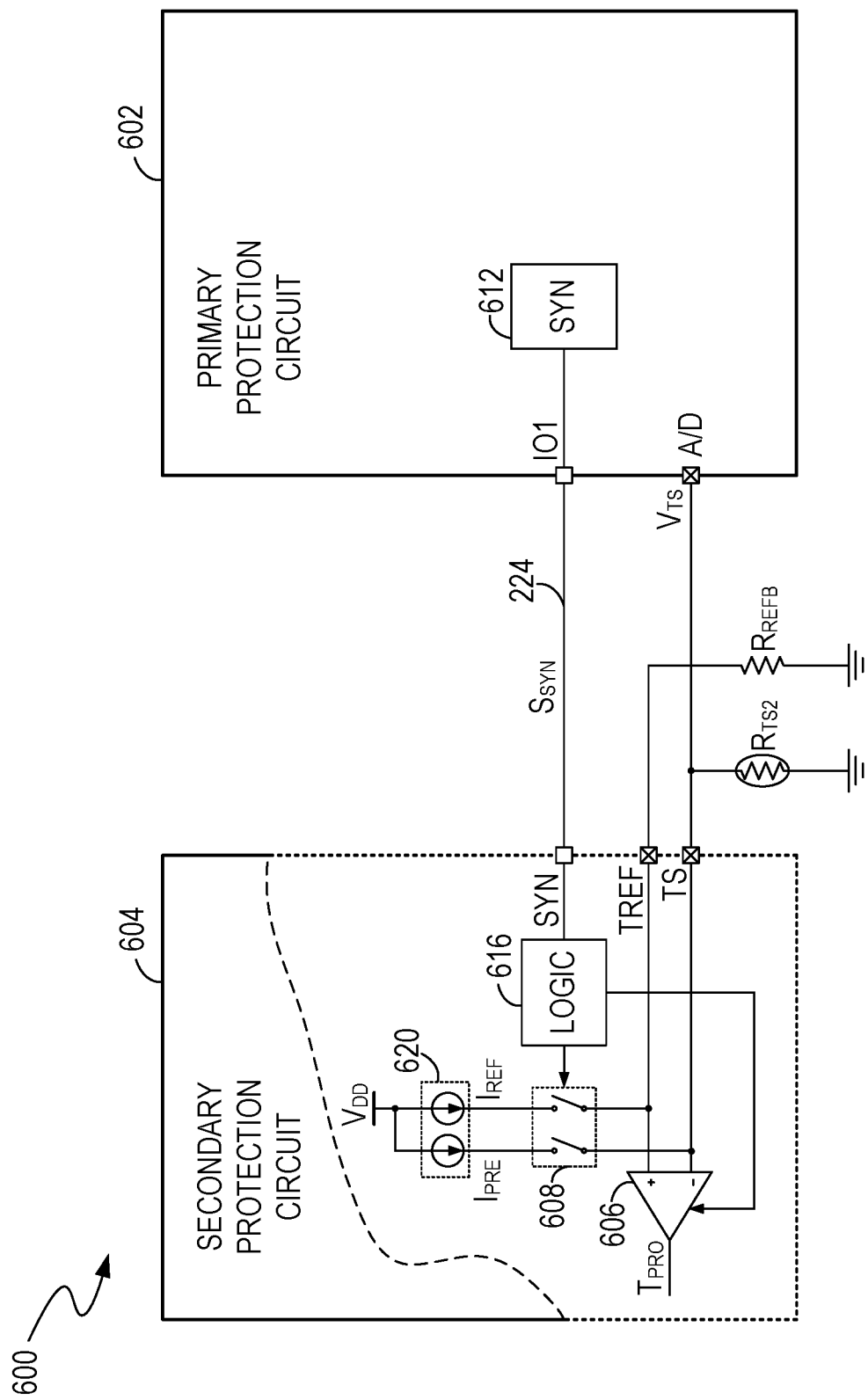
FIG. 6B illustrates an example of a circuit diagram of a battery protection system, in an embodiment of the present invention.

More specifically, an example of a circuit diagram of the battery protection system 600 is illustrated in FIG. 6B. FIG. 6B is described in combination with FIG. 2 and FIG. 6A. In the example of FIG. 6B, the primary protection circuit 602 includes a synchronizing signal generating circuit 612 (hereinafter, SYN circuit 612) that generates a synchronizing signal $S_{SYN}$ and controls a status of the synchronizing signal $S_{SYN}$. The secondary protection circuit 604 includes a current source 620 (e.g., a current mirror), a switch circuit 608, a comparator 606, and a logic circuit 616. The logic circuit 616 can receive the synchronizing signal $S_{SYN}$ and control the switch circuit 608 and the comparator 606 according to the synchronizing signal $S_{SYN}$.

In an embodiment, when the synchronizing signal $S_{SYN}$ is in the second state, the logic circuit 616 can turn on the switch circuit 608 at an abovementioned preset frequency, and enable the comparator 606 at the preset frequency. Thus, the secondary protection circuit 604 can sample the sense signal $V_{TS}$ at the preset frequency. When the synchronizing signal $S_{SYN}$ is in the second state, the primary protection circuit 602 does not sample the sense signal $V_{TS}$. When the synchronizing signal $S_{SYN}$ is in the first state, the logic circuit 616 can keep the switch circuit 608 turned on, and the primary protection circuit 602 samples the sense signal $V_{TS}$. When the synchronizing signal $S_{SYN}$ is in the first state, the logic circuit 616 may, but not necessarily, disable the comparator 606.

Although a logic circuit 616 is disclosed in FIG. 6B, the logic circuit 616 can be omitted in another implementation. For instance, as mentioned above, the communication channel 224 can include an interface such as an I²C interface, an UART interface, or the like, and the synchronizing signal $S_{SYN}$ in the communication channel 224 can include a set of signals. The set of signals may include a signal that controls the switch circuit 608, and a signal that controls the comparator 606.

In the example of FIG. 6B, the current source 620 can be a high-precision current source, e.g., a bandgap reference current source or the like, and can generate a high-precision preset current $I_{PRE}$ that remains constant if the ambient environment, e.g., ambient temperature, changes. Thus, the primary protection circuit 602 can receive a high-precision sense signal $V_{TS}$ from the thermistor $R_{TS2}$, compare the high-precision sense signal $V_{TS}$ with a protection threshold (e.g., generated internally by the primary protection circuit 602) to detect an abnormal temperature condition, and protect the battery pack.

In another embodiment, the current source 620 can be a regular current source, e.g., a lower-cost current source. The preset current $I_{PRE}$ and the reference current $I_{REF}$ generated by the current source 620 may change slightly if the ambient temperature changes. In one such embodiment, the primary protection circuit 602 receives both the sense signal $V_{TS}$ and the reference voltage $V_{TREF}$, and compares the sense signal $V_{TS}$ with the reference voltage $V_{TREF}$ to detect an abnormal temperature condition. Although the preset current $I_{PRE}$ and the reference current $I_{REF}$ may slightly change if the ambient temperature changes, the preset current $I_{PRE}$ is still substantially equal to the reference current $I_{REF}$. Thus, the primary protection circuit 602 can protect the battery pack. Examples are illustrated in FIG. 6C and FIG. 6D.

Figure 6C:
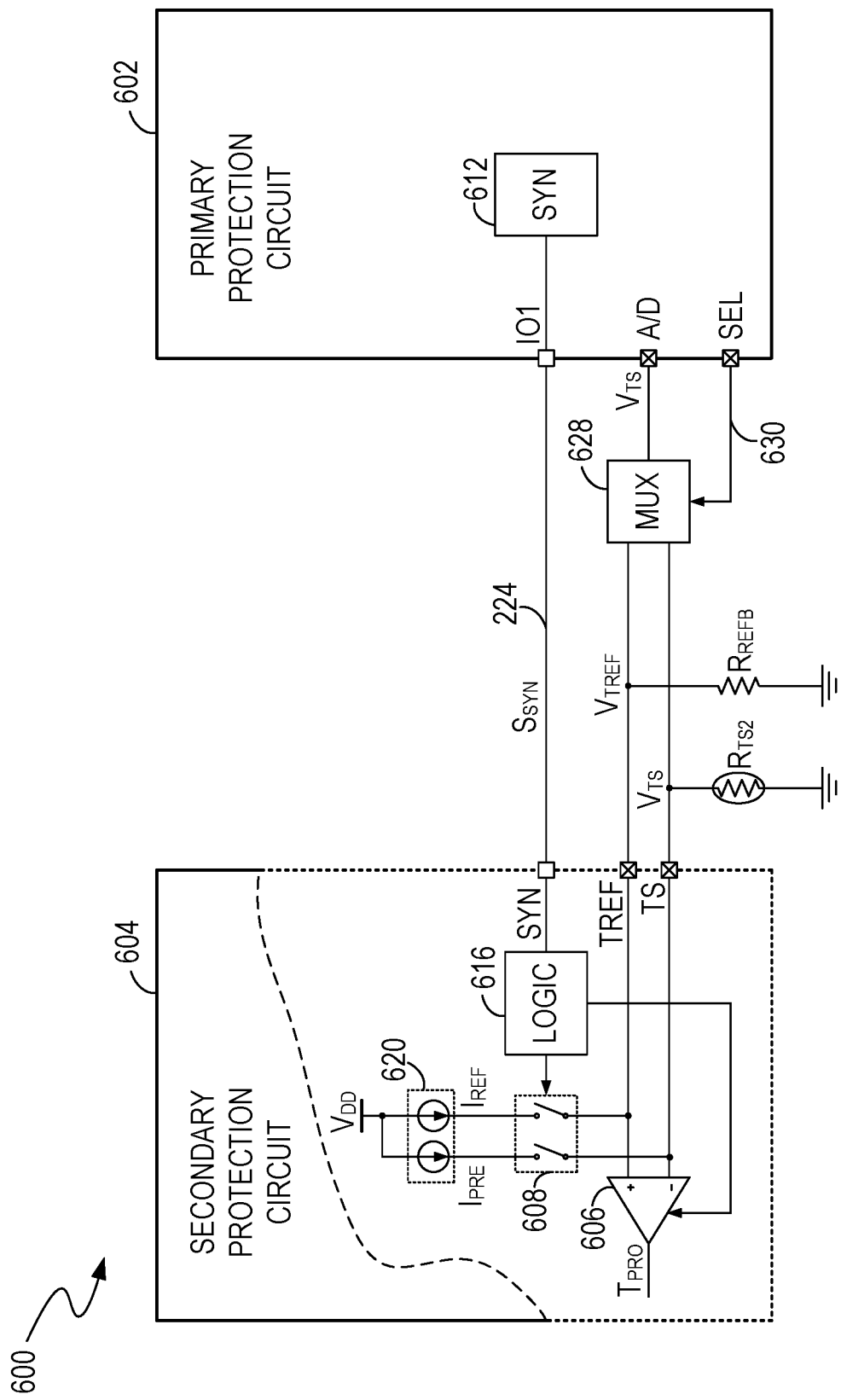
FIG. 6C illustrates an example of a circuit diagram of a battery protection system, in an embodiment of the present invention.

FIG. 6C illustrates an example of a circuit diagram of the battery protection system 600, in another embodiment of the present invention. FIG. 6C is described in combination with FIG. 2, FIG. 6A and FIG. 6B. In the example of FIG. 6C, the battery protection system 600 includes a selector 628 (e.g., a multiplexer) coupled to the A/D terminal (e.g., an input terminal of an analog to digital converter) of the primary protection circuit 602. The selector 628 receives a sense signal $V_{TS}$ from the thermistor $R_{TS2}$ and a reference voltage $V_{TREF}$ from the reference resistor $R_{REFB}$, and selectively outputs the sense signal $V_{TS}$ or the reference voltage $V_{TREF}$ to the primary protection circuit 602 under the control of a select signal 630 from the primary protection circuit 602. The primary protection circuit 602 can receive the sense signal $V_{TS}$ when the select signal 630 is logic high (or logic low), and receive the reference voltage $V_{TREF}$ when the select signal 630 is logic low (or logic high). As a result, the primary protection circuit 602 can receive the sense signal $V_{TS}$ and the reference voltage $V_{TREF}$ via the selector 628 and the A/D terminal.

Figure 6D:
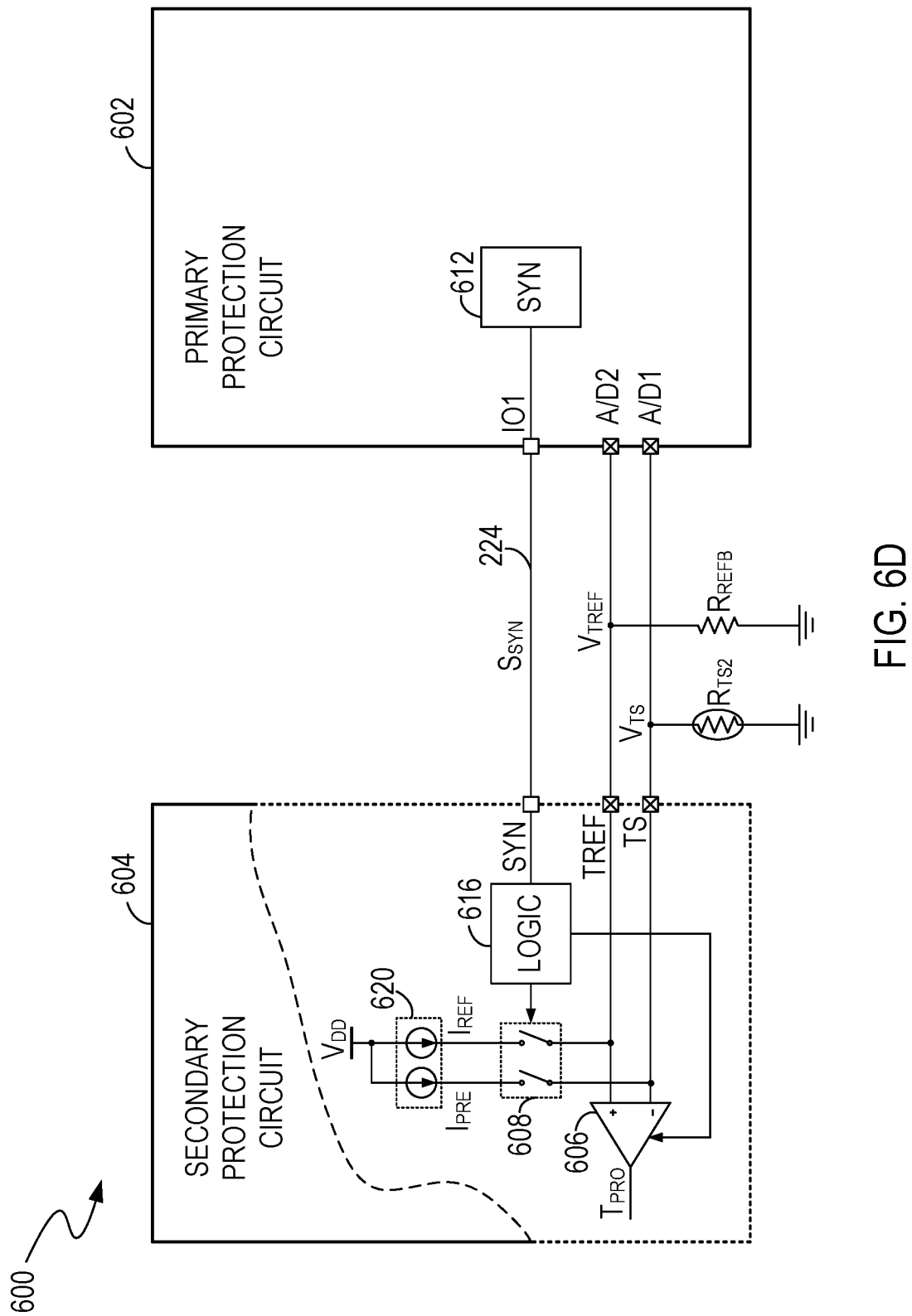
FIG. 6D illustrates an example of a circuit diagram of a battery protection system, in an embodiment of the present invention.

FIG. 6D illustrates an example of a circuit diagram of the battery protection system 600, in another embodiment of the present invention. FIG. 6D is described in combination with FIG. 2, FIG. 6A and FIG. 6B. In the example of FIG. 6D, the primary protection circuit 602 includes a monitoring terminal A/D1 that receives the sense signal $V_{TS}$, and a monitoring terminal A/D2 that receives the reference voltage $V_{TREF}$.

Figure 7:
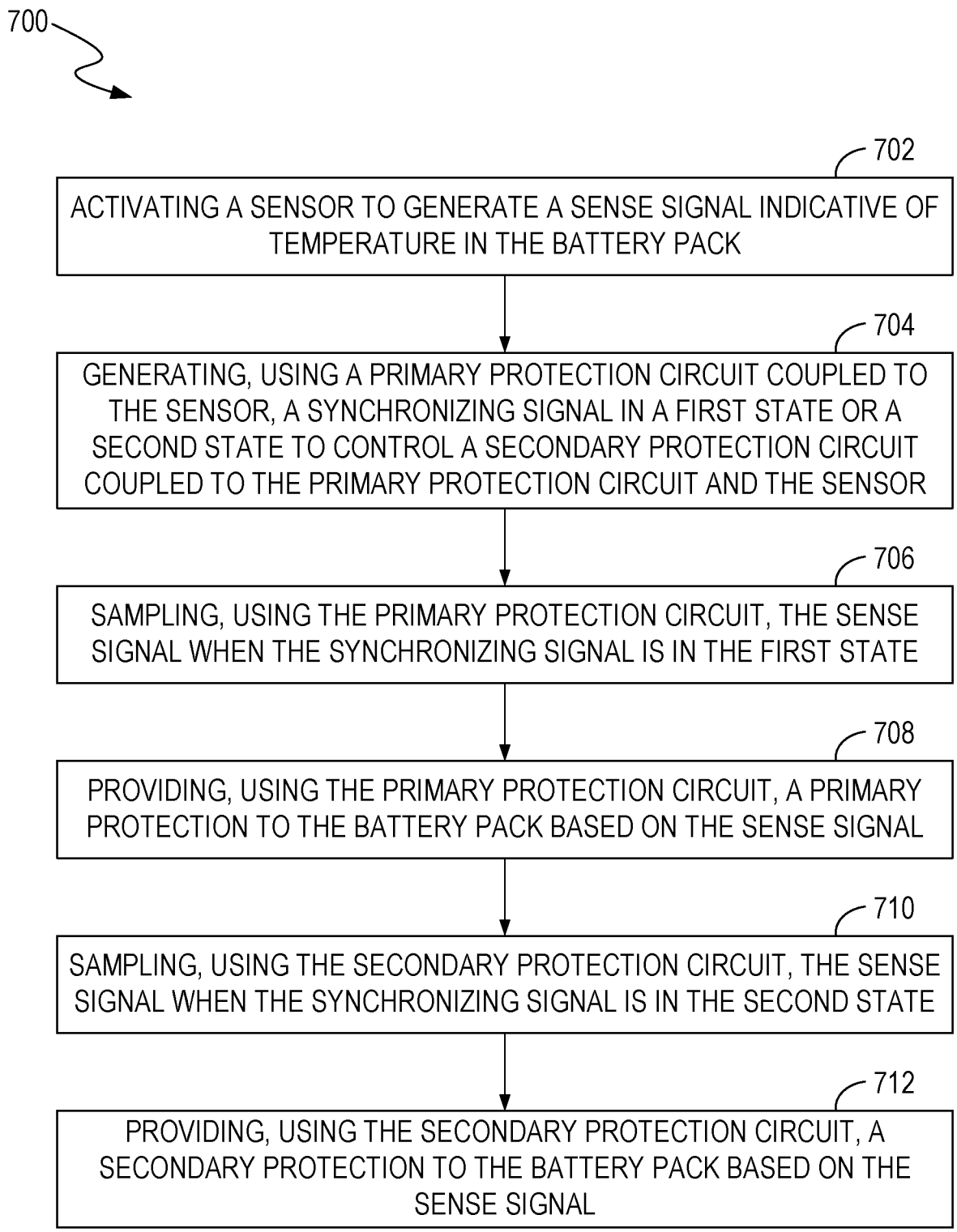
FIG. 7 illustrates a flowchart of examples of operations performed by a battery protection system, in an embodiment of the present invention.

FIG. 7 illustrates a flowchart 700 of examples of operations performed by a battery protection system, in an embodiment of the present invention. FIG. 7 is described in combination with FIG. 2, FIG. 3A, FIG. 3B, FIG. 4A, FIG. 4B, FIG. 5A, FIG. 5B, FIG. 6A and FIG. 6B. Although specific steps are disclosed in FIG. 7, such steps are examples for illustrative purposes. That is, embodiments according to the present invention are well suited to performing various other steps or variations of the steps recited in FIG. 7.

At step 702, a temperature sensor $R_{TS2}$ is activated to generate a sense signal $V_{TS}$ indicative of a temperature in a battery pack.

At step 704, a primary protection circuit, e.g., 202, 302, 402, 502 or 602, generates a synchronizing signal $S_{SYN}$ in a first state or a second state to control a secondary protection circuit, e.g., 204, 304, 404, 504 or 604, coupled to the primary protection circuit and the temperature sensor $R_{TS2}$.

At step 706, when the synchronizing signal $S_{SYN}$ is in the first state, the primary protection circuit samples the sense signal $V_{TS}$.

At step 708, the primary protection circuit provides primary protection to the battery pack based on the sense signal $V_{TS}$.

At step 710, when the synchronizing signal $S_{SYN}$ is in the second state, the secondary protection circuit samples the sense signal $V_{TS}$.

At step 712, the secondary protection circuit provides secondary protection to the battery pack based on the sense signal $V_{TS}$.

In summary, embodiments of the present invention provide battery protection systems in which a primary protection circuit and a secondary protection circuit share a temperature sensor. For example, the primary protection circuit generates a synchronizing signal to synchronize the operations of the primary and secondary protection circuits. The primary protection circuit performs the sampling of the temperature sense signal when the synchronizing signal is in a first state, and the secondary protection circuit performs the sampling of the temperature sense signal when the synchronizing signal is in a second state. Because the primary and secondary protection circuits share a temperature sensor, the cost and the PCB (printed circuit board) size of the battery protection system can be reduced. The power consumption of the battery protection system can also be reduced.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

I claim:

1. A battery protection system comprising:
   a sensor configured to generate a sense signal indicative of a temperature in a battery pack when said sensor is activated;
   a primary protection circuit, coupled to said sensor, and configured to generate a synchronizing signal in one of a first state and a second state, sample said sense signal when said synchronizing signal is in said first state, and provide primary protection to said battery pack based on said sense signal when said synchronizing signal is in said first state; and
   a secondary protection circuit, coupled to said primary protection circuit and said sensor, and configured to be controlled by said synchronizing signal, sample said sense signal when said synchronizing signal is in said second state, and provide secondary protection to said battery pack based on said sense signal when said synchronizing signal is in said second state.

2. The battery protection system of claim 1, wherein when said synchronizing signal is in said second state, said secondary protection circuit is configured to activate said sensor at a preset frequency and sample said sense signal at said preset frequency; and wherein when said synchronizing signal is in said first state, said battery protection system is configured to maintain said sensor in an active condition to provide said sense signal to said primary protection circuit.

3. The battery protection system of claim 2, wherein said sensor comprises:
   a thermistor; and
   a resistor coupled to said thermistor, wherein said battery protection system is configured to activate said sensor by applying a preset voltage across said resistor and said thermistor, and wherein said sense signal comprises a voltage signal at a connection node of said resistor and said thermistor.

4. The battery protection system of claim 3, wherein when said synchronizing signal is in said second state: said primary protection circuit is configured to disconnect a first preset voltage from said sensor, and said secondary protection circuit is configured to connect a second preset voltage to said sensor at said preset frequency; and wherein when said synchronizing signal is in said first state: said primary protection circuit is configured to maintain connection of said first preset voltage to said sensor, and said secondary protection circuit is configured to disconnect said second preset voltage from said sensor.

5. The battery protection system of claim 3, wherein when said synchronizing signal is in said second state, said secondary protection circuit is configured to connect said preset voltage to said sensor at said preset frequency; and wherein when said synchronizing signal is in said first state, said secondary protection circuit is configured to maintain connection of said preset voltage to said sensor.

6. The battery protection system of claim 2, wherein said sensor comprises:
   a thermistor, wherein said battery protection system is configured to activate said thermistor by generating a preset current through said thermistor, and wherein said sense signal comprises a voltage on said thermistor.

7. The battery protection system of claim 6, wherein when said synchronizing signal is in said second state: said primary protection is configured to disable a first preset current, and said secondary protection circuit is configured to generate, at said preset frequency, a second preset current that flows through said thermistor; and wherein when said synchronizing signal is in said first state: said primary protection circuit is configured to maintain flow of said first preset current through said thermistor, and said secondary protection circuit is configured to disable said second preset current.

8. The battery protection system of claim 6, wherein when said synchronizing signal is said second state, said secondary protection circuit is configured to generate said preset current at said preset frequency; and wherein when said synchronizing signal is in said first state, said secondary protection circuit is configured to maintain flow of said preset current through said thermistor.

9. A method for protecting a battery pack, said method comprising:

activating a sensor to generate a sense signal indicative of a temperature in said battery pack;

generating, using a primary protection circuit coupled to said sensor, a synchronizing signal in one of a first state and a second state to control a secondary protection circuit coupled to said primary protection circuit and said sensor;

sampling, using said primary protection circuit, said sense signal when said synchronizing signal is in said first state;

providing, using said primary protection circuit, primary protection to said battery pack based on said sense signal when said synchronizing signal is in said first state;

sampling, using said secondary protection circuit, said sense signal when said synchronizing signal is in said second state; and providing, using said secondary protection circuit, secondary protection to said battery pack based on said sense signal when said synchronizing signal is in said second state.

10. The method of claim 9, further comprising:
activating, using said secondary protection circuit, said sensor at a preset frequency when said synchronizing signal is in said second state;
sampling, using said secondary protection circuit, said sense signal at said preset frequency when said synchronizing signal is in said second state; and
maintaining said sensor in an active condition to provide said sense signal to said primary protection circuit when said synchronizing signal is in said first state.

11. The method of claim 10, wherein said sensor comprises a thermistor and resistor coupled to said thermistor, and wherein said method further comprises:
activating said sensor by applying a preset voltage across said resistor and said thermistor, wherein said sense signal comprises a voltage signal at a connection node of said resistor and said thermistor.

12. The method of claim 11, further comprising:
disconnecting, using said primary protection circuit, a first preset voltage from said sensor when said synchronizing signal is in said second state;
connecting, using said secondary protection circuit, a second preset voltage to said sensor at said preset frequency when said synchronizing signal is in said second state;
maintaining, using said primary protection circuit, connection of said first preset voltage to said sensor when said synchronizing signal is in said first state; and
disconnecting, using said secondary protection circuit, said second preset voltage from said sensor when said synchronizing signal is in said first state.

13. The method of claim 11, further comprising:
connecting, using said secondary protection circuit, said preset voltage to said sensor at said preset frequency when said synchronizing signal is in said second state; and
maintaining, using said secondary protection circuit, connection of said preset voltage to said sensor when said synchronizing signal is in said first state.

14. The method of claim 10, wherein said sensor comprises a thermistor, and wherein said method further comprises:
activating said thermistor by generating a preset current through said thermistor, wherein said sense signal comprises a voltage on said thermistor.

15. The method of claim 14, further comprising:
disabling, using said primary protection circuit, a first preset current when said synchronizing signal is in said second state;
generating, using said secondary protection circuit, a second preset current at said preset frequency through said thermistor when said synchronizing signal is in said second state;
maintaining, using said primary protection circuit, said first preset current through said thermistor when said synchronizing signal is in said first state; and
disabling, using said secondary protection circuit, said second preset current when said synchronizing signal is in said first state.

16. The method of claim 14, further comprising:
generating, using said secondary protection circuit, said preset current at said preset frequency when said synchronizing signal is said second state; and
maintaining, using said secondary protection circuit, said preset current through said thermistor when said synchronizing signal is in said first state.

17. A battery pack comprising:
a plurality of battery cells; and
a battery protection system coupled to said battery cells, wherein said battery protection system comprises:
a sensor configured to generate a sense signal indicative of temperature in said battery pack when said sensor is activated;
a primary protection circuit, coupled to said sensor, and configured to generate a synchronizing signal in one of a first state and a second state, sample said sense signal when said synchronizing signal is in said first state, and provide primary protection to said battery pack based on said sense signal when said synchronizing signal is in said first state; and
a secondary protection circuit, coupled to said primary protection circuit and said sensor, and configured to be controlled by said synchronizing signal, sample said sense signal when said synchronizing signal is in said second state, and provide secondary protection to said battery pack based on said sense signal when said synchronizing signal is in said second state.

18. The battery pack of claim 17, wherein when said synchronizing signal is in said second state, said secondary protection circuit is configured to activate said sensor at a preset frequency and sample said sense signal at said preset frequency; and wherein when said synchronizing signal is in said first state, said battery protection system is configured maintain said sensor in an active condition to provide said sense signal to said primary protection circuit.

19. The battery pack of claim 18, wherein said sensor comprises:
a thermistor; and
a resistor coupled to said thermistor, wherein said battery protection system is configured to activate said sensor by applying a preset voltage across said resistor and said thermistor, and wherein said sense signal comprises a voltage signal at a connection node of said resistor and said thermistor.

20. The battery pack of claim 18, wherein said sensor comprises:
a thermistor, wherein said battery protection system is configured to activate said thermistor by generating a preset current that flows through said thermistor, and wherein said sense signal comprises a voltage on said thermistor.

* * * * *